March 23, 1943.   S. LEVISON   2,314,586
TREATMENT OF FRUITS AND VEGETABLES
Filed March 20, 1940    5 Sheets-Sheet 4

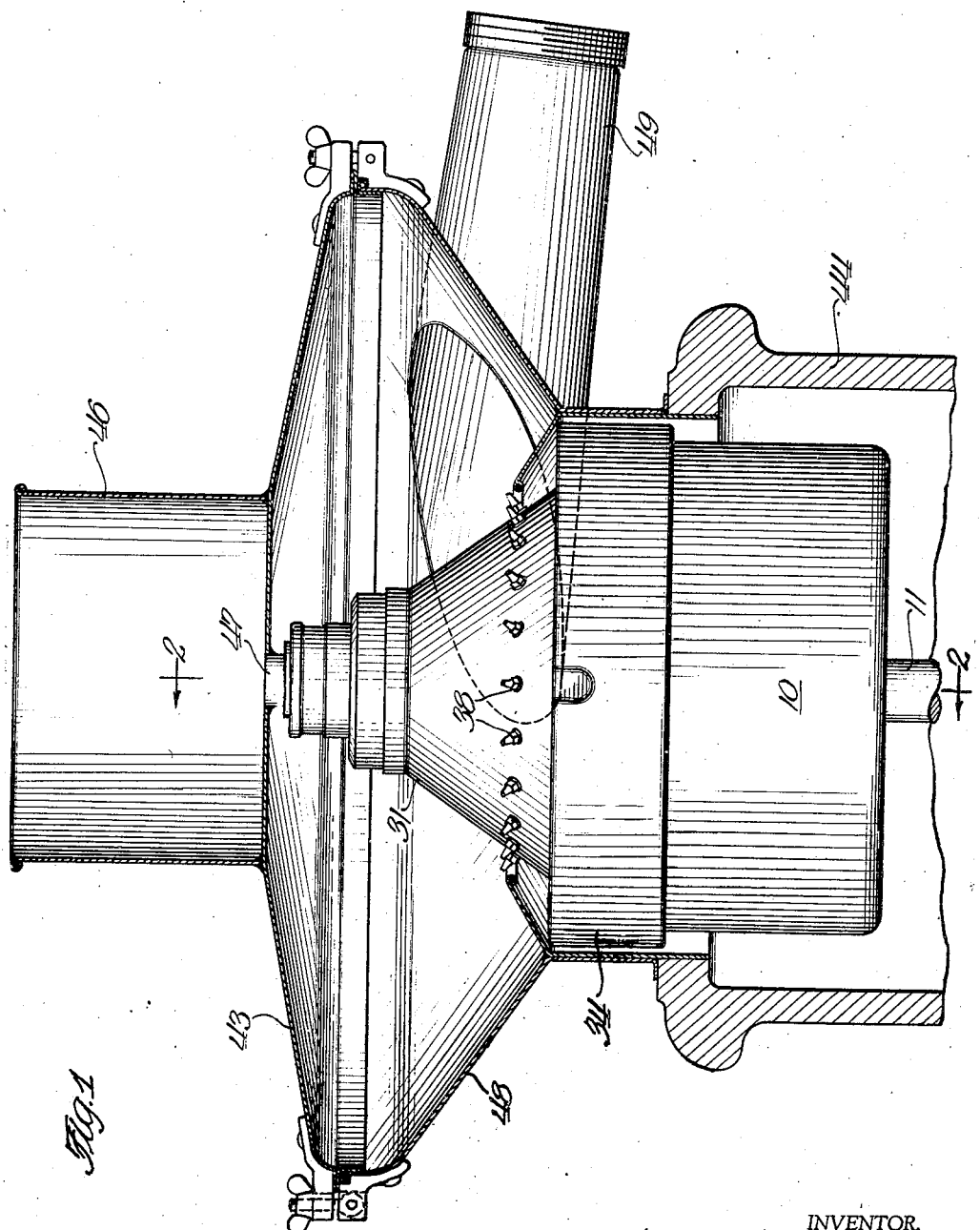

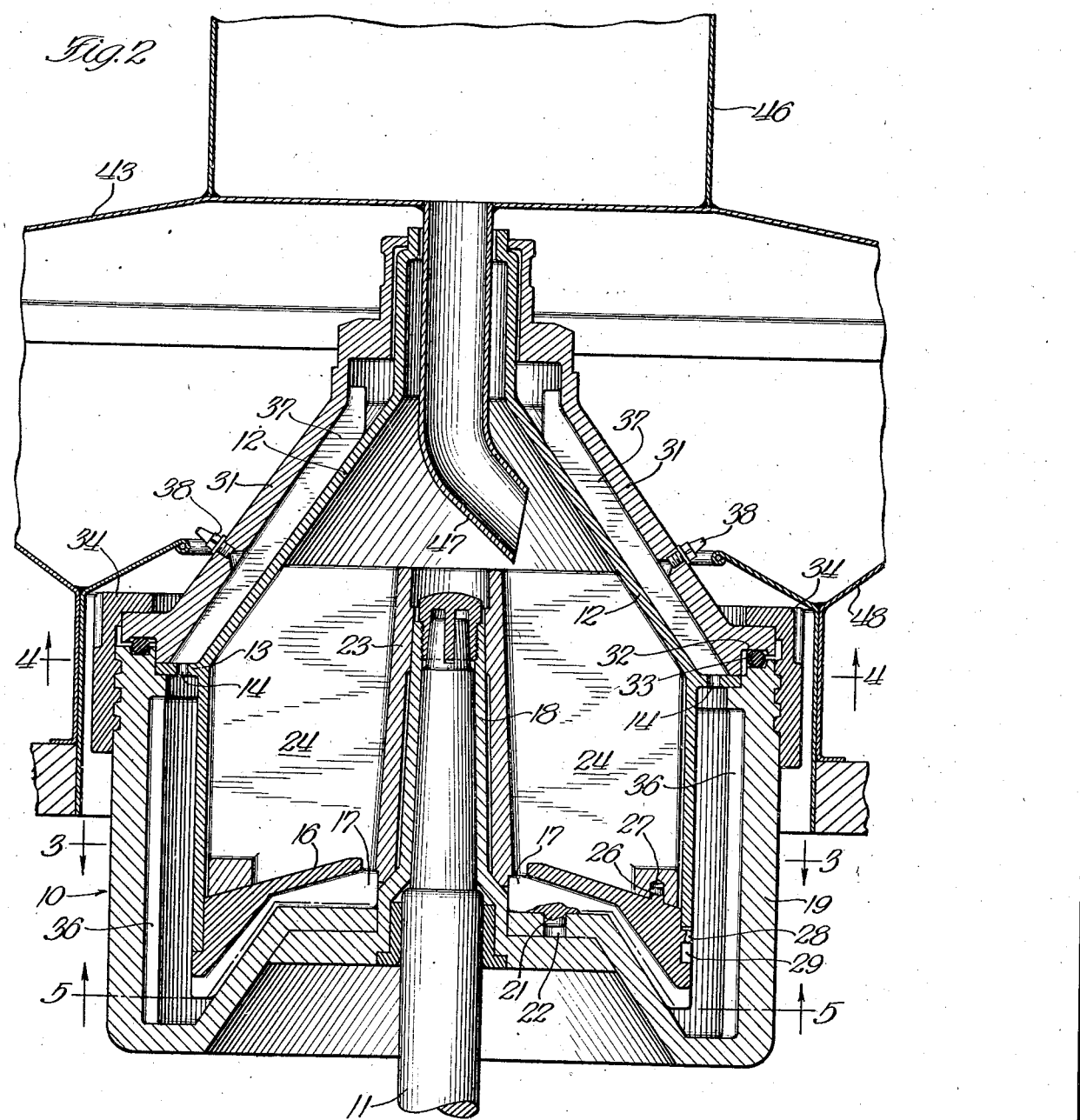

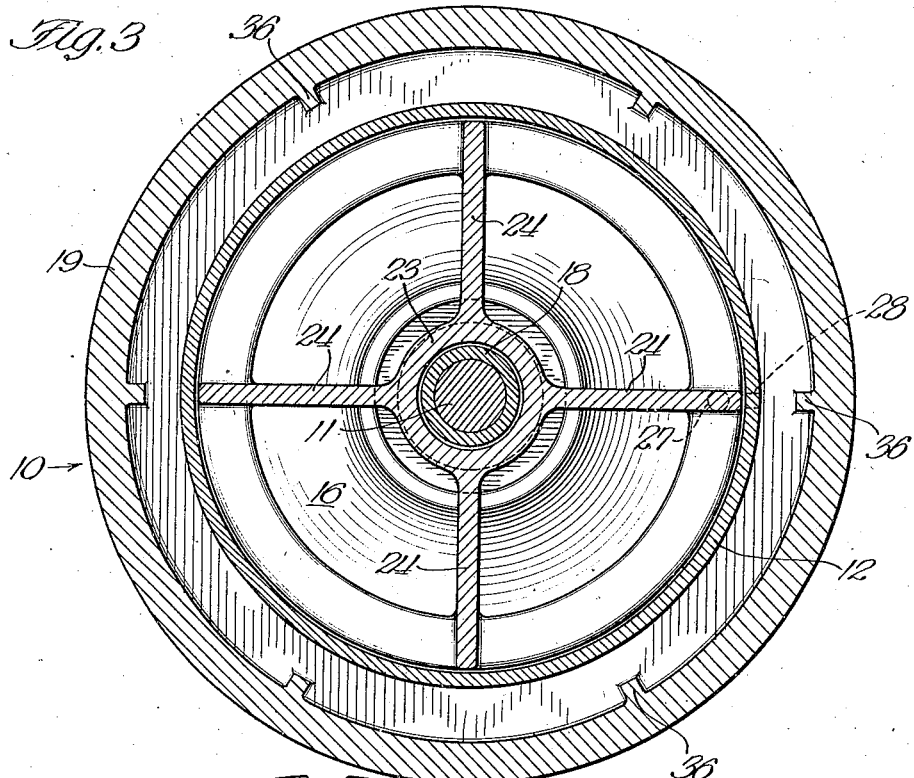
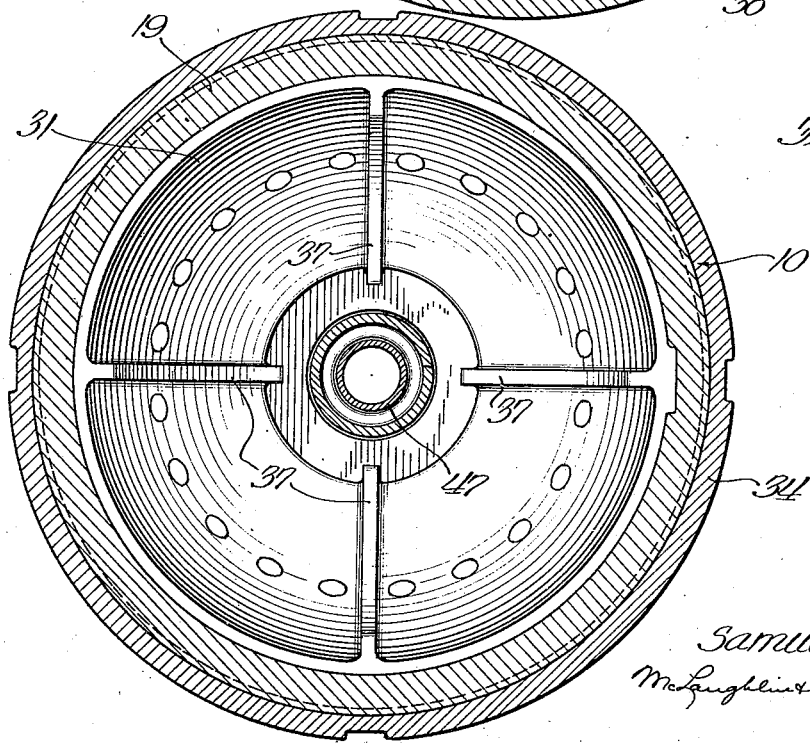

INVENTOR.
Samuel Levison
BY McLaughlin & Wallenstein
ATTORNEYS

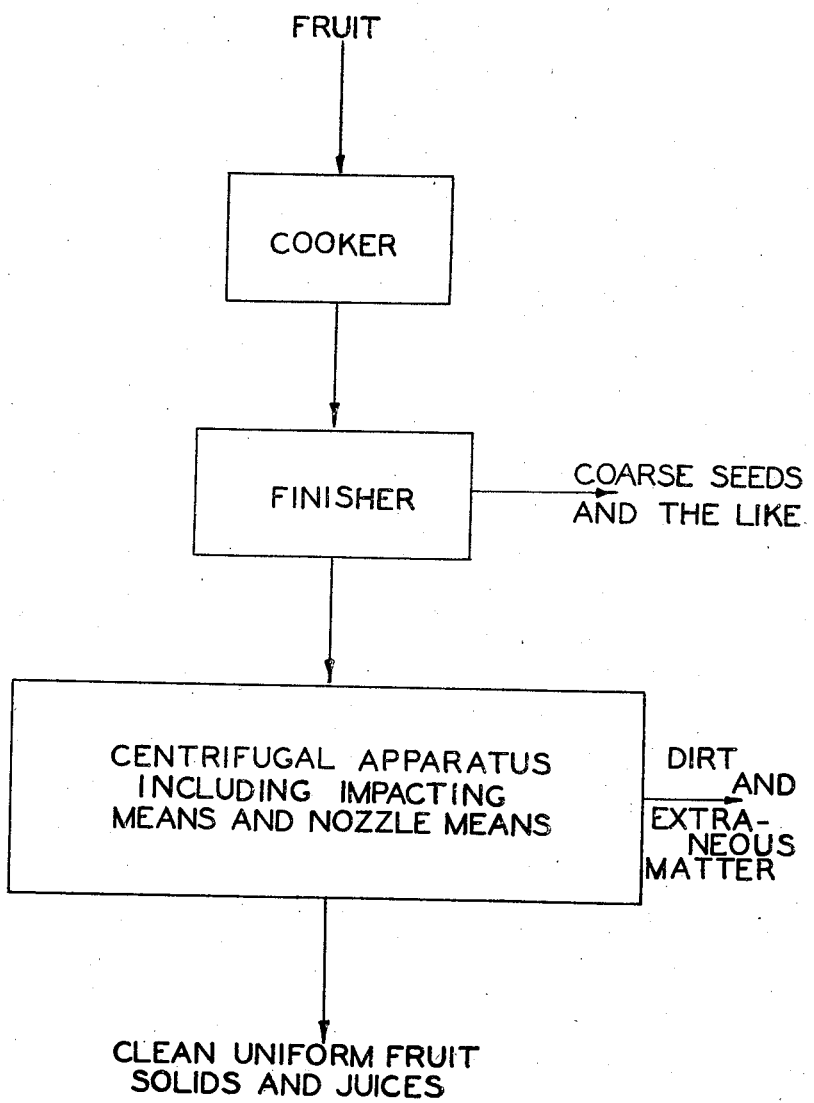

Patented Mar. 23, 1943

2,314,586

UNITED STATES PATENT OFFICE 2,314,586

TREATMENT OF FRUITS AND VEGETABLES

Samuel Levison, Chicago, Ill.

Application March 20, 1940, Serial No. 324,960

12 Claims. (Cl. 146—219)

This invention relates to the treatment of fruits and vegetables and is particularly concerned with a new and novel process of and apparatus for the breaking up or disintegration of the natural cell structure or cellular formation of the fruits or vegetables so as to render the same exceedingly smooth and fluffy. These results are obtained while, at the same time, removing dust, dirt, fibrous material, grit, sediments and undesired materials in general from the fruits and vegetables and while recovering a substantial maximum of the desired fruit or vegetable solids and juices.

The cell structure or cellular form of different fruits and vegetables varies in size and shape and the tenacity with which the cells are held together. To break down this cellular formation and reduce all cells to identical or substantially identical size is exceedingly difficult to accomplish, particularly in view of the fact that, in the same process, all dust, dirt, fibrous material, sediments and undesired materials in general must be removed if the most desirable results are to be obtained. Thus, for example, in case of berries of the bush variety, dust, dirt and grit from the fields are blown on or otherwise brought in contact with the berries, and as the berries continue to grow this dust, dirt and grit become encased or embedded in the flesh of the berry. The removal of this extraneous and undesired matter from the berry by a washing operation is not only substantially impossible because of the encasement thereof in the berry flesh but there are also serious objections to such washing operations. In the case of delicate berries, such as red raspberries and black raspberries, any substantial amount of washing with water is unfeasible since such washing results in the removal of considerable amounts of color and juice from the berries in addition to bringing about material losses of desired fruit constituents. Furthermore, washing will not remove certain hard particles which are present in many fruits and vegetables and the removal of which is highly desirable if a fully satisfactory product is to be produced.

In the case of fruits and vegetables of the so-called hard variety, such as apples, or those in which the cells are bonded or held together by more cohesive values, the dirt and extraneous matter tend to be bound more closely between the cells or within the cell structure. To attempt to remove the sediments from fruits or vegetables of this character by washing with water is not feasible.

The present invention involves a novel process, hereinafter described in detail, whereby the cellular formation or cell structure of fruits and vegetables is essentially completely disintegrated or broken down regardless of the cohesive principles which tend to hold the cell together, and the cells, in turn, are radically reduced in size and rendered substantially uniform in size and character. At the same time, the undesirable dust, dirt, grit, sediments, fibrous material, hard particles, and, in general, undesirable constituents and materials of the fruits and vegetables are effectively removed in a simple and efficacious manner without loss of the desired fruit or vegetable solids and juices.

In general, the present invention makes use of the principle of centrifugal action coupled with other features, as hereinafter described in detail. It is known that it has heretofore been proposed to utilize centrifugal means to separate fruit oils from fruit juices, to separate seeds and skins from tomato pulp, and to separate sludge particles and the like from fruit juices. None of these known procedures has any relation to my invention.

If fruit or vegetable pulp is passed through a centrifugal bowl or basket separator or centrifuge such as the ordinary cream separator or the like, the effluent from the bowl or basket consists primarily of fruit juices or liquids, and a wall or layer of desirable fruit solids containing occluded dirt, sand, and the like, builds up rapidly on the interior surface of the bowl or basket. The machine must be stopped frequently for cleaning these accumulations in the bowl or basket. Moreover, the products produced are not those desired for preserving or similar purposes since the cell formation or cell structure is not broken down to particles of minute size and of like character or shape. On the contrary, the fruit juices are merely separated from the relatively coarse fruit solids and, furthermore, the fruit solids remain contaminated with dust, dirt and the like.

It has been discovered that if a fruit or vegetable pulp, preferably preliminarily treated as hereinafter described, is subjected to centrifugal action in an inner bowl shell, provided with arms or paddles, and which is fitted over a centrifugal pump, all as is hereinafter described in detail, surprisingly enough the dirt, sand or grit and other undesirable constituents separate out from the desirable fruit or vegetable pulp or solids and juices and build up as a layer on the interior wall of the inner shell of the bowl. The fruit or vegetable pulp passes over and through a series of paddles which serve primarily to break up or disintegrate the cellular structure or the cell formation or such formations which, in the natural fruits or vegetables or in the pulps thereof prior to treatment, may be characterized as hanging together in bunches or clusters. The action is such as to loosen the grit and extraneous matter held in the bunches, and this material, being heavier, is thrown to the interior wall of the inner shell and held there, while the cell clusters, which tend to be broken down into separate units of cells in varying sizes and shapes and are at the same time rendered lighter, are forced toward the center of the bowl and downward to a centrifugal pump by hydrostatic pressure.

The desired pulp solids and juices are brought up to a very high velocity of rotation by this pump and the high pressure such as is exerted thereby serves to force the material through nozzles having fine openings therein. The cells, which are greatly reduced in size in this manner, are further blasted or impinged against the receiving cover which causes a further breaking up of the cells, effects the incorporation of air into the fruit mass and inhibits the reformation of clusters of cells.

The practice of the present invention permits relatively continuous operation without the necessity for frequent stoppage of operations for removing accumulations from the centrifugal bowl. As illustrative of the invention, it is possible to feed fruit pulp continuously into a relatively small centrifuge of the character indicated, and as more fully described hereinafter, for a period of eight hours with only several interruptions for cleansing of the bowl. On the other hand, and by way of sharp contrast, the employment of the conventional centrifugal apparatus for treating fruit pulp requires interruption for cleaning every few minutes, independently of the fact that the removal of dirt, dust and the like from the desired constituents is not affected, nor are the chain or cell cluster formations broken up to completely release the dirt, grit, sand and extraneous matter. Moreover, by utilizing the conventional centrifugal apparatus, the cells are not reduced to minute size, nor rendered homogeneous in character, nor is there any action equivalent to that resulting from impingement of the cells against a properly shaped surface under high pressure whereby a considerable volume of air is mixed with effluent, the effect of which is to maintain the cells as separate, minute particles, and prevent reforming said cells into chain or clustered groups.

In order that those skilled in the art may even more fully understand the novel features of the present invention, and the manner in which the same may be carried out, the invention is described hereinbelow in conjunction with the accompanying drawings wherein:

Fig. 1 is an elevational view, certain parts being removed, of a centrifugal machine which may be used in the practice of the process of the present invention.

Figure 2 is a vertical section of the apparatus of Figure 1 and showing the details of construction and the arrangement and assembly of the various parts.

Figure 3 is a sectional view taken along the line 3—3 of Figure 2, looking in the direction of the arrows.

Figure 4 is a sectional view, slightly reduced in scale, taken along the line 4—4 of Figure 2, looking in the direction of the arrows.

Figure 8 is a flow sheet illustrating generally the process of my invention.

Figure 5:
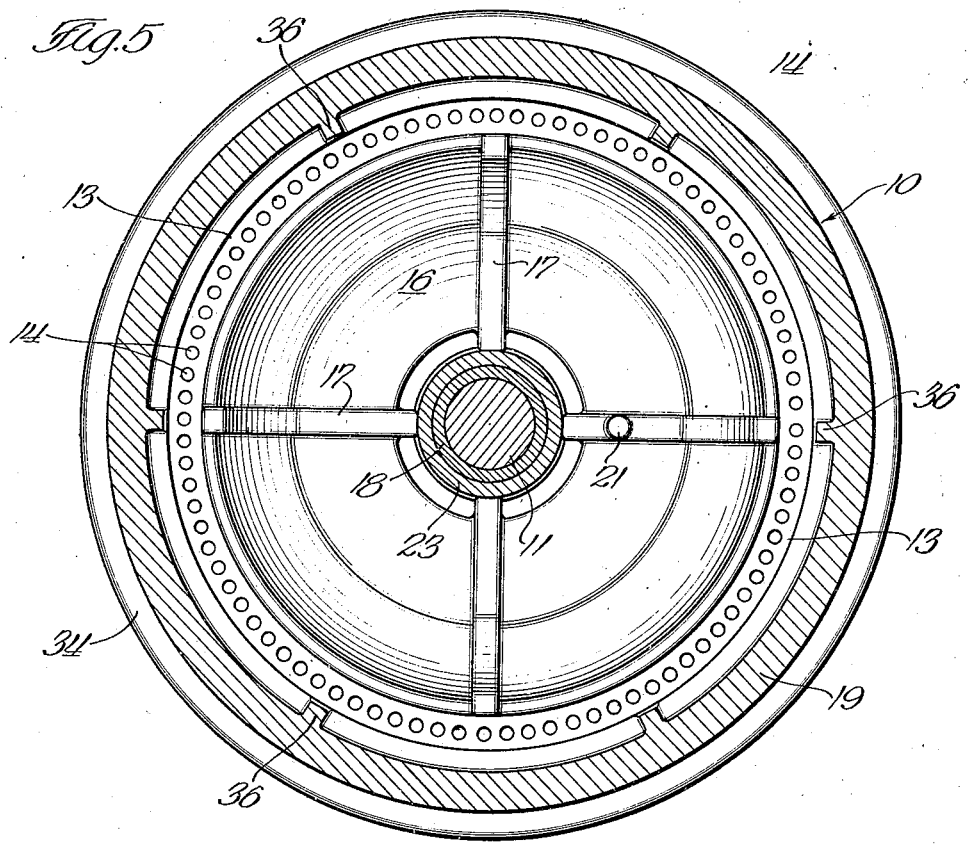
Figure 5 is a sectional view taken along the line 5—5 of Figure 2, looking in the direction of the arrows.
Figure 7:
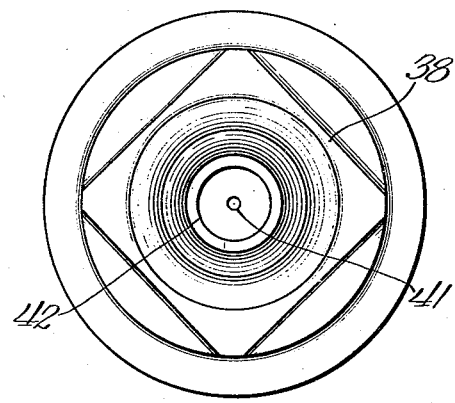
Figure 7 is a face or elevational view of one of the nozzles looking in a direction parallel to the axis of the nozzle opening or aperture.

As shown in the drawings, a bowl assembly 10 is mounted upon a vertical shaft or spindle 11 adapted to be rotated at a high rate of speed by means (not shown) such as a steam turbine or motor. The bowl assembly 10 is made up of a series of elements which are locked together so as to rotate as a unit. As shown more particularly in Figure 2, the bowl assembly 10 comprises an inner shell or drum 12 which is preferably shaped to provide upper and lower spaced cylindrical sections of different diameters which are separated by a generally conically shaped member which, at the juncture with the lower cylindrical member, is provided with a circular flange 13 having a series of spaced holes or apertures 14 therein. Instead of utilizing apertures, an open channel portion may be provided to obtain greater pressure at certain nozzles, hereinafter described. Centrifugal pump means 16 in the form of a centrally apertured circular plate having a plurality of vanes 17, preferably equally spaced and four in number, is disposed on the bottom surface of said plate. The centrifugal pump means 16 is fitted over the hub 18 and is keyed to the bottom portion of an outer drum 19 by means of a pin 21 which fits into a recess or aperture 22 in the bottom of the outer drum 19.

A hub member 23 to which a plurality of radially extending paddles or arms 24, preferably four in number, are affixed, is provided with a central aperture so that said hub member 23 may be fitted or disposed over the hub 18 and keyed to the centrifugal pump means 16 through the pin 26 and co-operating aperture 27 in one of the arms 24. It will thus be seen that the outer drum 19, centrifugal pump means 16 and hub member 23 with its paddles or arms 24 are keyed or locked together so that they may be rotated as a unit. The inner drum or shell 12 fits over the assembly previously described, and as shown more particularly in Figure 2, and is keyed to the centrifugal pump means 16 through a pin 28 on the latter which fits into a slot 29 at the bottom edge of the shell 12.

Disposed over the shell 12 is a conically shaped member 31 the peripheral edge 32 of which rests upon a gasket ring 33 of suitable material, such as rubber or metal, disposed in a well on the upper periphery of the outer drum 19. An inner threaded locking ring 34 serves to lock or key together as a unit the member 31 and the outer drum 19. It will be clear, therefore, that the entire assembly comprising the inner and outer drums or shells 12 and 19, centrifugal pump means 16, arms or paddles 24 and conical member 31 will rotate together as a unit when power is applied to the spindle or shaft 11.

There is preferably attached to the inner surface of the drum 19, and conveniently formed integrally therewith, a series of spaced vertically arranged ribs 36. The number of such ribs may be varied, the drawings showing six, or they may be entirely eliminated. These ribs appear to aid in breaking down the structure of the fruit pulp and, in certain cases, facilitate the desired upward flow of the fruit pulp. A series of spaced ribs 37 is attached to the inner surface of the conical member 31, which ribs 37 may be equally spaced from each other. The number of such ribs may also be varied, the drawings showing four, or they may be entirely eliminated. These ribs 37 tend to stop or decrease the swirling of the fruit pulp in the space between the shell 12 and the conical member 31 and, in certain instances, bring about a more satisfactory operation on the fruit pulp.

Figure 6:
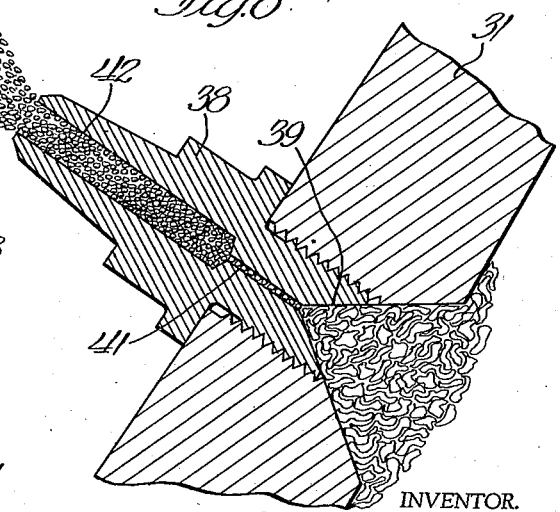
Figure 6 is an enlarged sectional view showing the construction and arrangement of one of the nozzles and the fruit or vegetable pulp as it passes into and issues from the nozzle.

Disposed about the periphery of the conical member 31 is a series of spaced nozzles 38, which nozzles are preferably spaced equi-distantly from each other. The number of such nozzles may vary but, in general, approximately twelve represents a satisfactory number on a device in which the diameter of the inner shell 12 is of the order of 6 to 7 inches. As is more particularly shown in Figure 6, the nozzles are screw threaded into the conical member 31. The inlets 39 are enlarged, being preferably conically shaped. Directly connected to the conically shaped inlet portion of the nozzle is a small bore orifice or aperture 41 which, in turn, leads to an enlarged bore or aperture 42 from which the fruit pulp is ejected. The large conical inlet is provided for the purpose of seizing the pulp material and directing it through the small aperture 41 through which it is forced under great pressure and wherein the cell structure is disintegrated or broken down to render the product of uniform, homogeneous character. The enlarged bore 42 allows the material to expand as it issues from the bore 41, this release of pressure serving, among other things, to enhance the capacity of each nozzle. The nozzle 41 may, of course, vary in size but excellent results have been obtained where the diameter thereof was of the order of 0.001 inch. The diameter of the bore 42, as shown in Figure 6, may be several times larger. The nozzles 38 are so disposed that the fruit pulp, as it issues from the jets, is projected, with great force, against the inner surface of the cover member 43, which, together with the enclosing member 44, serves to house the rotating bowl assembly 10. It will be seen that the fruit pulp is projected or impinged with great force against the surface of the cover 43, this causing a further breaking up of the cells and at the same time commingling the projected fruit material with air so as to form a homogeneous, light, air impregnated fruit mass. The result of the action is such that the tendency of the fruit cells to coalesce or to re-form into clusters or bunches is substantially inhibited. The cover 43 is provided with a feed hopper 46 which feeds the material into an inlet spout 47, and suitably connected to the casing 48 is an outlet spout 49 through which the effluent in the form of the final pulp issues in a continuous stream. The amount of fruit product treated may be varied by controlling the rate of flow of the pulp through the inlet spout 47. The rate at which the material is fed into the apparatus will depend upon the exact nature of the fruit or vegetable product and the exact results sought so far as the finished effluent is concerned.

Considering the treatment of apples in accordance with the invention by way of example, the apples, after being sorted to remove those which are decayed or imperfect, are first thoroughly washed in water and are then placed in a wooden tank. For each bushel of apples, approximately one gallon of water is added and then the mass is subjected to the action of live steam to effect partial cooking so as to reduce the apples to a soft consistency and to effect extraction of the pectin therefrom. In certain cases, depending upon the nature or condition of the fruit, the addition of water may be eliminated. The water aids in softening the apples and in somewhat breaking down their structure so as to aid in effecting the substantially complete removal of dirt, sand and other foreign matter, as hereinafter described. The degree of softening and the extent of the cooking are variable, depending upon the character of the fruit, its consistency, ripeness, and the like. In general, depending of course on the size of the batch, a cooking or steaming period of three to five minutes is satisfactory. The apples, including the water in which they have been cooked, are then passed through a "finisher" or "pulper" having, for example, a 0.027 inch or 0.040 inch mesh screen, which serves to separate coarse seeds, skins, stems, cores, or other similar matter from the desired fruit solids and juices. The conventional "finisher" or "pulper" comprises a perforated cylinder into which the fruit mixture is passed, the desired fruit solids and juices being forced through the perforations with the aid of an arm, brush or paddle which is mounted in the cylinder and moves, relatively to the cylinder, in close contact with the inner wall thereof. In this manner, the coarse seeds, skins, stems and certain other undesired foreign particles remain in the cylinder from which they are then ejected, and the desired fruit solids and juices pass away therefrom and are recovered in the form of a pulp.

The fruit product issuing from the "finisher" or "pulper" does not possess those qualities and characteristics which make for a product of outstanding utility, particularly where the same is employed in the preparation of preserves, as hereinafter pointed out. The cells are, in general, of relatively large and non-uniform size and are held together in clumps or clusters, the result being that the product does not possess the desired smoothness, texture or other characteristics. Furthermore, the fruit product still contains small particles of sand, dirt and other undesirable foreign matter which were not removed in the "finisher" or "pulper," some of which undesired matter is embedded in or between the cell walls of the fruit product. In order to obtain a product of the desired properties and characteristics, the dirt and other undesired foreign matter must be removed, the clumps or clusters of cells must be broken up in such a way as to prevent their reforming, and the product must be rendered of a uniform, smooth texture.

To this end, the apple pulp, obtained as described above from the "finisher" or "pulper," is fed into the centrifugal apparatus described hereinabove. The pulp is disposed in the hopper 46 from which it is fed in a continuous stream through the spout 47 into the drum 12 which is rotated at a speed of several thousand revolutions per minutes. While the speed of rotation is, of course, variable, a speed of from 6,000 R. P. M. to 8,000 R. P. M. is, in general satisfactory, particularly good results being obtained with a speed of approximately 7,000 R. P. M. when utilizing a drum having an internal diameter of about eight inches and a depth of about five inches, with a rate of feed of about 1,000 pounds to 1,200 pounds of apple pulp per hour.

As the apple pulp enters the drum 12, it is struck by the arms or paddles 24 which subject said pulp to a violent impacting or disintegrating action and break down the cell structure thereof whereby, among other things, the dirt and the like which is embedded or encased within or between the cell walls is released and may be separated from the desired fruit solids and juices. This dirt and extraneous matter is thrown to the interior wall of the drum 12 where it collects, mainly along the lower cylindrical portion of the same, as a layer. The lighter fruit solids and juices are forced toward the center of the drum 12 and downward, by hydrostatic pressure, to the centrifugal pump means 16 which, in turn, forces the same upward under high pressure into the space between the drum 12 and the outer shell 19, through the openings 14 in the flange 13 and then through the nozzles 38. As described hereinbefore, the nozzles 38 are so constructed as to have a widened or enlarged inlet or receiving portion, which, in the embodiment shown best in Figure 6, is of conical shape, the result being that the fruit product is initially grabbed or seized and then forced under high pressure through the bores 41 and 42 and impinged or projected with great force against the inner surface of the cover member 43. As the jets of fruit pulp are projected from the nozzles, they commingle with the air present in the casing 48 and there is a further commingling of fruit pulp and air after the fruit pulp has struck the cover 43 and moved away therefrom. The result is that the effluent which is discharged from the outlet spout 49 in a continuous stream comprises a light, air-impregnated, fluffy-like product which is characterized by exceptional smoothness of texture, and uniformity and homogeneity. The product contains essentially all of the desired and beneficial fruit solids and juices and only the foreign and other objectionable matter are removed, collecting as a layer gradually increasing in thickness primarily on the interior surface of the lower cylindrical portion of the inner bowl or shell 12.

The operation of the apparatus is substantially continuous, it being necessary to interrupt operations not more than once for every 1,000 to 1,200 pounds of fruit pulp treated to clean the bowl of the accumulated dust, dirt, sand and other foreign matter. In a representative run on apples in accordance with the process, for a total of 660 pounds of fruit solids and juices recovered, the amount of fibre, dirt, dust and grit and the like which collected on the walls of the bowl amounted to approximately ten ounces. Surprisingly enough, as previously pointed out, the operation of the apparatus in accordance with the invention does not remove all of the ingredients which are heavier than the effluent but permits the discharge of the desirable fruit or vegetable solids together with the lighter liquid effluent, the objectionable foreign matter remaining behind in the bowl.

In addition to the advantages resulting from the practice of the invention which have been pointed out hereinabove, it should also be noted that the fruit or vegetable product is more palatable and is more readily digested. In the case of those fruits or vegetables which normally contain pectin, for example, apples, the treatment to which the same is subjected results in effectively releasing the pectin so that excellent preserves and jams, particularly of the so-called seedless type, may be prepared from such fruits without the necessity for utilizing an extraneous source of pectin. For example, exceptionally satisfactory raspberry and strawberry preserves may be prepared by admixing raspberries or strawberries with an equal amount, or even more, of apples treated in accordance with the present invention and cooked down with sugar to the desired consistency, lemon juice or other sources of edible acids being used to acidulate the products. The apples are in such condition as a result of the treatment to which they are subjected in accordance with the present invention that they do not mask the flavors of other blended fruits. The result is that raspberry or strawberry jams and preserves, for example, may contain even more apples than raspberries or strawberries and still the presence of the apples will not be apparent by tasting the products. Instead of strawberries or red or black raspberries, other fruits or vegetables such as blackberries, peaches, graspes, plums, currants, pineapple, gooseberries, tomatoes, carrots, and the like may be blended with the treated apples or other fruits or vegetables to make preserves, jams and similar products.

The fruit and vegetable products produced in accordance with the present invention may also be canned, with or without additional sugar and/or other ingredients. The products can be utilized as such or carbonated and sweetened for beverage purposes, for the preparation of flavoring syrups, sauces, purees, as fillings for bakery goods, as infant foods, in pharmaceutical preparations, and for the various uses to which fruits and vegetable products may be placed.

It is evident that the process of the present invention is adapted for the treatment of fruits and vegetables in general to effect the breaking up or disintegration of the cell structure and cell arrangement and the removal therefrom of dust, dirt, sand and other objectionable foreign matter while permitting a substantially maximum recovery of the desirable fruit or vegetable solids and juices. Among the fruits and vegetables which may be treated are, for example, apples, pears, carrots, spinach, tomatoes, asparagus, strawberries, blackberries, raspberries, grapes, youngberries, boysenberries, loganberries, dewberries, quinces, and the like. Other fruit products which may be treated in accordance with the present invention are the so-called apple chops or other dried apple or other fruit and vegetable products.

The centrifugal machine used in carrying out the process may be of variable size and capacity as, for example, up to 18 inches or more in diameter of the inner bowl or shell with a through-put of from 50 gallons to 600 gallons, or more or less, hourly of fruit or vegetable pulp. Furthermore, it will be evident that the speed of rotation of the centrifugal bowl or shell may be varied within relatively wide limits without departing from the spirit of the invention. Those skilled in the art will, in the light of the teachings herein, readily be able to make such modifications or adaptations as the exigencies of any particular case may dictate, all within the scope of the invention as pointed out in the appended claims.

What I claim as new and desire to protect by Letters Patent of the United States is:

1. A process for treating fruits or vegetables to break down the structure thereof and to effect the removal of dust, dirt and other undesirable materials, which includes the steps of subjecting a pulp of said fruits or vegetables to a violent impacting action of at least one arm in a rapidly rotating centrifugal bowl, whereby embedded dirt or the like, which is heavier than the desired juices and pulp solids, is released from the pulp and collects as a layer along an inner wall of said bowl and whereby the desired juices and pulp solids are drawn inwardly and separate from said dirt and the like, and then forcing said juices and pulp solids under high pressure by centrifugal pump means through at least one nozzle having a relatively fine aperture therein whereby said pulp solids are further disintegrated.

2. A process for treating fruits or vegetables to break down the structure thereof and to effect the removal of dust, dirt and other undesirable materials, which comprises subjecting a pulp of said fruits or vegetables to a violent impacting action of at least one arm in a rapidly rotating centrifugal bowl, whereby embedded dirt or the like, which is heavier than the desired juices and pulp solids is released from the pulp and collects as a layer along an inner wall of said bowl and whereby the desired juices and pulp solids are drawn inwardly and separate from said dirt and the like, forcing said juices and pulp solids under high pressure by centrifugal pump means through at least one nozzle having a relatively fine aperture therein and impinging the material with substantial force against a surface as it issues from said nozzle whereby said material is further disintegrated and forms a light, fluffy, substantially homogeneous mass.

3. In a process for treating apples to break down the structure thereof and to effect the removal of dust, dirt and undesirable materials, the steps which comprise subjecting the apples to a preliminary heating operation to soften the same, passing the resulting product through a "finisher," "pulper" or the like to remove at least a substantial part of such coarse seeds or other undesired matter as may be present, passing the remaining apple product into a rapidly rotating centrifugal powl provided on its interior with a series of spaced arms whereby said apple product is subjected to a violent impacting operation the result of which is to break down the structure thereof and release embedded dirt or the like which, being heavier than the desired apple solids and juices, collects as a layer along the inner walls of said bowl, and subjecting the desired apple solids and juices to the action of centrifugal pump means and thereby forcing the same upwardly under substantial pressure through a series of nozzles having fine apertures therein whereby the cell arrangement is further broken down.

4. In a process for treating apples to break down the structure thereof and to effect the removal of dust, dirt, and undesirable materials, the steps which comprise subjecting the apples to a preliminary heating operation to soften the same, passing the resulting product through a "finisher," "pulper" or the like to remove at least a substantial part of such coarse seeds or other undesired matter as may be present, passing the remaining apple product into a rapidly rotating centrifugal bowl provided on its interior with a series of spaced arms whereby said apple product is subjected to a violent impacting operation the result of which is to break down the structure thereof and release embedded dirt or the like which, being heavier than the desired apple solids and juices, collects as a layer along the inner walls of said bowl, subjecting the desired apple solids and juices to the action of centrifugal pump means and thereby forcing the same upwardly under substantial pressure through a series of nozzles having fine apertures therein and with great force against a surface as said product issues through said nozzles, whereby the cell arrangement is broken down to provide a light, somewhat aerated, substantially homogeneous mass.

5. In a process for treating fruits of the character of apples to break down the structure thereof and to effect the removal of dust, dirt and undesirable materials, the steps which comprise subjecting the fruits to preliminary operations to break down the structure thereof and remove at least a substantial part of such coarse seeds or other undesired matter as may be present, passing the remaining fruit product into a rapidly rotating centrifugal bowl provided on its interior with a series of spaced arms which rotate together with said bowl whereby said fruit product is subjected to a violent impacting operation the result of which is to break down the structure thereof and release embedded dirt or the like which, being heavier than the desired fruit solids and juices, collects as a layer along the inner walls of said bowl, and subjecting the desired fruit solids and juices to the action of centrifugal pump means and thereby forcing the same under substantial pressure through a series of nozzles having fine apertures therein whereby the cell arrangement is further broken down.

6. In a process for treating apples to break down the structure thereof and to effect the removal of dust, dirt and undesirable materials, the steps which comprise subjecting the apples to a steaming operation to soften the same, passing the resulting product through a "finisher," "pulper" or the like to remove at least a substantial part of such coarse seeds or other undesired matter as may be present, passing the remaining apple product into a rapidly rotating centrifugal bowl provided on its interior with a series of spaced arms fixed to rotate together with said bowl whereby said apple product is subjected to a violent impacting operation the result of which is to break down the structure thereof and release embedded dirt or the like which, being heavier than the desired apple solids and juices, collects as a layer along the inner walls of said bowl, subjecting the desired apple solids and juices to the action of centrifugal pump means and thereby forcing the same upwardly under substantial pressure through a series of nozzles having fine apertures therein and with great force against a surface as said product issues through said nozzles, whereby the cell arrangement is broken down to provide a light, somewhat aerated, substantially homogeneous mass.

7. A continuous process for treating fruits or vegetables to break down the structure thereof and to effect the removal of dust, dirt and other undesirable materials, which comprises subjecting a pulp of said fruits or vegetables to a violent impacting action of a plurality of arms fixedly disposed in a rapidly rotating centrifugal bowl, whereby embedded dirt or the like is released from the pulp and, being heavier than the desired juices and pulp solids, collects as a layer along an inner wall of said bowl and whereby the desired juices and pulp solids are drawn inwardly and separate from said dirt and the like, forcing said juices and pulp solids under high pressure by centrifugal pump means upwardly through at least one nozzle having a relatively fine aperture therein and impinging the material with substantial force against a surface as it issues from said nozzle whereby said material is further disintegrated and commingles with air to form a light, fluffy, substantially homogeneous mass.

8. An apparatus for treating fruits or vegetables to break down the structure thereof and to effect the removal of dust, dirt and other undesirable materials, comprising a bowl assembly which is adapted to be rapidly rotated, said bowl assembly comprising an inner and an outer bowl, in communication with each other at the lower portions thereof, said bowls being spaced from each other to provide a narrow passageway therebetween, the inner and outer bowls comprising cylindrical, concentrically arranged sections, at least one arm disposed within said inner bowl, the bottoms of said inner and outer bowls being spaced apart to provide a generally open annular space, the bottom of said inner bowl being provided with a central opening communicating with said space, centrifugal pump means disposed adjacent the bottom of said inner bowl, said centrifugal pump including a plurality of thin, widely spaced substantially radial vanes in said space which serve to force fruit material under substantial pressure through the narrow passageway between the bowls, and an annular series of nozzles peripherally arranged about said bowl, each having a fine opening therein, so constructed and arranged that the inlet thereof communicates with the aforesaid passageway, the arm and the centrifugal pump means being locked together with said inner and outer bowls so that said parts rotate together as a unit, means to feed fruit or vegetable material into the inner bowl, and means to withdraw the treated material.

9. Apparatus of the character described comprising a stationary outer casing, centrifugal means disposed at least in part within said casing, said centrifugal means comprising a bowl assembly which is adapted to be rotated at a high rate of speed on a vertical shaft or spindle, said bowl assembly comprising an inner bowl, an outer bowl surrounding and enclosing said inner bowl and communicating therewith adjacent its bottom and spaced therefrom to provide a passageway which is at least in part generally vertical, a plurality of arms disposed within said inner bowl, the bottoms of said inner and outer bowls being spaced apart to provide a generally open annular space, the bottom of said inner bowl being provided with a central opening communicating with said space, centrifugal pump means independent of said arms and disposed adjacent the bottom of said inner bowl and positioned below said arms, said centrifugal pump means including a plurality of thin, widely spaced substantially radial vanes in said space which serve to force material under substantial pressure through the narrow passageway between the bowls, the inner and outer bowls, the arms and the centrifugal pump means being locked to each other and so constructed and arranged as to rotate together as a unit, and an annular series of nozzles peripherally arranged about said bowl, each communicate with the aforesaid passageway and are so disposed that the material ejected from the nozzles strikes with substantial force against the inner surface of a portion of said casing.

10. Apparatus of the character described comprising a stationary outer casing, centrifugal means disposed at least in part within said casing, said centrifugal means comprising a bowl assembly which is adapted to be rotated at a high rate of speed on a vertical shaft or spindle, said bowl assembly comprising an inner cylindrical bowl, an outer bowl surrounding and enclosing said inner bowl and communicating therewith adjacent its bottom and spaced therefrom to provide a passageway which is at least in part generally vertical, said outer bowl comprising a lower cylindrical portion and an upper generally conical portion, a plurality of arms disposed within said inner bowl, the bottoms of said inner and outer bowls being spaced apart to provide a generally open annular space, the bottom of said inner bowl being provided with a central opening communicating with said space, centrifugal pump means independent of said arms and disposed adjacent the bottom of said inner bowl and positioned below said arms, said centrifugal pump means including a plurality of thin, widely spaced substantially radial vanes in said space which serve to force material under substantial pressure through the passageway between the bowls, the inner and outer bowls, the arms and the centrifugal pump means being locked to each other and so constructed and arranged as to rotate together as a unit, and an annular series of nozzles peripherally arranged about the upper portion of said outer bowl, each having fine openings therein, and communicating with the aforesaid passageway and so disposed that the material ejected from the nozzles strikes with substantial force against the inner surface of a portion of said casing, and means for feeding material into the inner bowl and for withdrawing the treated material from the outer casing.

11. An apparatus for treating fruits or vegetables to break down the structure thereof and to effect the removal of dust, dirt and other undesirable materials, comprising a bowl assembly which is adapted to be rapidly rotated, said bowl assembly comprising inner and outer communicating bowls spaced from each other to provide a narrow passageway therebetween, said inner and outer bowls comprising cylindrical, concentrically arranged sections, at least one arm disposed within said inner bowl, the bottoms of said inner and outer bowls being spaced apart to provide a generally open annular space, the bottom of said inner bowl being provided with a central opening communicating with said space, centrifugal pump means independent of said arm and disposed below said arm and adjacent the bottom of said inner bowl, said centrifugal pump means including a plurality of thin, widely spaced substantially radial vanes in said space which serve to force fruit material under substantial pressure through the narrow passageway between the bowls, and an annular series of nozzles peripherally arranged about said bowl, each communicating with the aforesaid passageway, said nozzles being provided with an enlarged inlet which leads to a fine bore which, in turn, leads to a larger bore, whereby the fruit or vegetable material is initially seized, then rifled through the fine bore and then expanded as it passes the larger bore, means to feed fruit or vegetable material into the inner bowl, and means to withdraw the treated material.

12. Apparatus of the character described comprising a stationary outer casing, centrifugal means disposed at least in part within said casing, said centrifugal means comprising a bowl assembly which is adapted to be rotated at a high rate of speed on a vertical shaft or spindle, said bowl assembly comprising an inner bowl, an outer bowl in communication with and surrounding and enclosing said inner bowl and spaced therefrom to provide a narrow passageway which is at least in part generally vertical, a plurality of arms disposed within said inner bowl, the bottoms of said inner and outer bowls being spaced apart to provide a generally open annular space, the bottom of said inner bowl being provided with a central opening communicating with said space, centrifugal pump means independent of said arms and disposed adjacent the bottom of said inner bowl and positioned below said arms, said centrifugal pump means including a plurality of thin, widely spaced substantially radial vanes in said space which serve to force material under substantial pressure through the narrow passageway between the bowls, the inner and outer bowls, the arms and the centrifugal pump means being locked to each other and so constructed and arranged as to rotate together as a unit, and an annular series of nozzles peripherally arranged about the said outer bowl, each of which communicates with the aforesaid passageway and is so disposed that the material ejected from the nozzles strikes with substantial force against the inner surface of a portion of said casing, said nozzles being provided with an enlarged inlet which leads to a fine bore which, in turn, leads to a larger bore, whereby the material being treated is initially seized, then rifled through the fine bore and then expanded as it passes into the larger bore.

SAMUEL LEVISON.